April 30, 1963  W. W. HOAGLAND ETAL  3,087,171

PAD FOR SPRING CUSHIONS AND METHOD OF MAKING SAME

Filed Jan. 25, 1961  3 Sheets-Sheet 1

INVENTORS
WILLIAM W. HOAGLAND
EDWARD P. BOLEN
BY Price & Heneveld

ATTORNEYS

April 30, 1963 W. W. HOAGLAND ETAL 3,087,171
PAD FOR SPRING CUSHIONS AND METHOD OF MAKING SAME
Filed Jan. 25, 1961 3 Sheets-Sheet 2

INVENTORS
WILLIAM W. HOAGLAND
EDWARD P. BOLEN
BY Price & Heneveld
ATTORNEYS

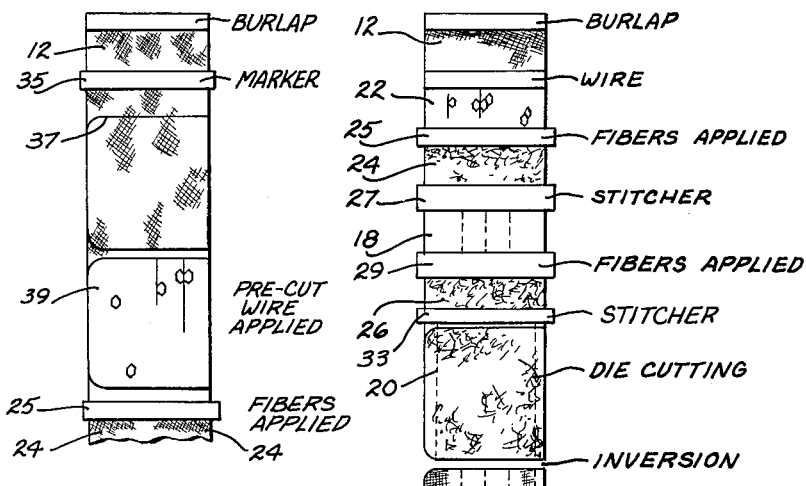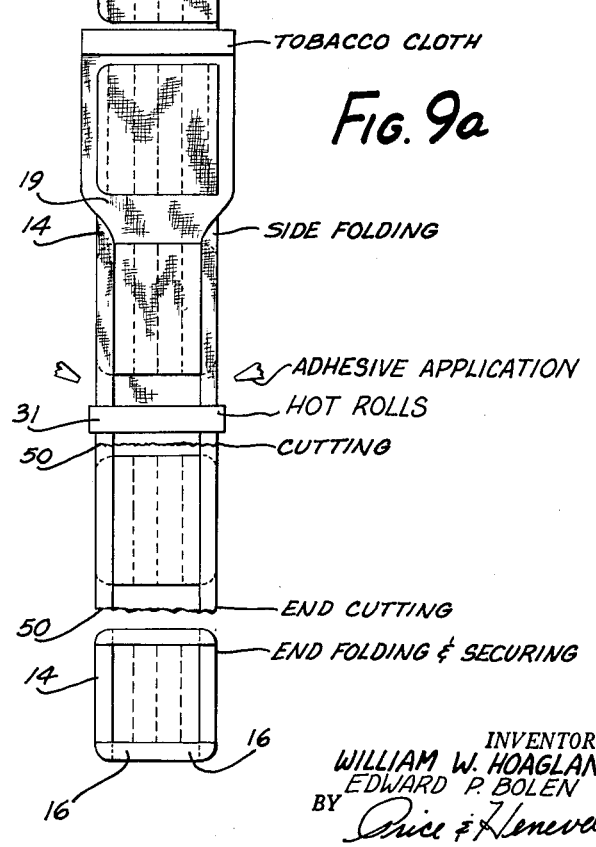

United States Patent Office 3,087,171
Patented Apr. 30, 1963

3,087,171
PAD FOR SPRING CUSHIONS AND METHOD
OF MAKING SAME
William W. Hoagland and Edward P. Bolen, Grand
Rapids, Mich., assignors to American Auto-Felt Corporation, Grand Rapids, Mich., a corporation of
Michigan
Filed Jan. 25, 1961, Ser. No. 84,938
9 Claims. (Cl. 5—354)

This invention relates to laminated pads, and more particularly to spring support pads for covering springs of supporting furniture articles. By "article" is meant the category including human supporting and resting items such as seats, especially automobile seats, mattresses and related items having any of various types of springs to provide the basic comfort-lending characteristics.

Laminated pads to cover coil type, sinusoidal type, or other type of springs which are embodied in an automobile seat, in a mattress, or the like, and called support pads have a primary purpose of preventing "feel" of the individual springs by the passenger, and to prevent spring covering materials from settling down between spring members. With a poor quality support pad, the seat or mattress possesses a lumpy sensation due to feel of the spaced springs which impart the sensation of lumps as contrasted to intermediate spaces. Other purposes are (1) distributing the passenger weight load over a large portion of the article for general comfort and seat durability without detracting from the form fitting properties designed into the spring, and (2) effectuating a smooth, uniform aesthetically appealing surface.

To produce these pads in a relatively inexpensive manner, it is customary to construct a laminate around an inexpensive fibrous material such as cotton fibers, as used in combination with burlap sheet or other woven cloth sheet material, and with elongated supporting wires or synthetic cords located beneath this fibrous layer and laced through the burlap sheet or enclosed in a plastic material.

To provide the above desirable effects, the insulating pad should possess an optimum amount of contiguity and tensile strength to uniformly distribute the load to eliminate spring "feel" or lumpiness, to maintain article durability, and to prevent covering materials from settling between the springs; and to provide sufficient recovery ability to respond to the removal of the passenger and assume the original smooth seat surface. Further, this must be done very economically due to the highly competitive nature of the art.

Prior support pads, especially as made for automobile seats, have been only partially successful in accomplishing these purposes, with the more effective pads necessitating complex and relatively costly operations. For example, many manufacturers have resorted to a pad having a series of individual, large stiff wires which are either (1) jammed through rumpled burlap sheets with special machines to obtain a final unrumpled sheet having parallel individual wires projecting back and forth therethrough; or (2) are enclosed in a special plastic sheath to maintain their oriented position. The ends of these stiff wires must be anchored by deformation around a transverse rod to prevent jabbing of passengers. Further, these stiff wires cannot be cut to various lengths and jammed through burlap to completely fit modern two and three dimensionally curved automobile seats without considerable added cost. Therefore, these wires are cut substantially shorter than the seat width, thereby leaving much used end spaces several inches long having only fibrous material which cannot of itself prevent spring "feel." Further, since these wire supports do not extend to the seat edges, portions of the pad are susceptible to lateral shifting with persons sliding into and out of the automobile. This produces bunching of the padding, rumpling of the pad covering cloth and general disheveling of the layers. The layers of these prior pads inherently function almost completely independently of each other and thus rapidly become disorganized with respect to each other. These methods possess the added disadvantage of necessitating special equipment as is well known in the art. In addition, an extra sheet of burlap is necessary to sustain the stiff wires and allow their assembly to the laminate after all stitching operations have taken place because of the inevitable severing of these stiff wires during stitching and their later protrusion out of the pad.

It should also be noted that pads constructed according to prior art methods tend to form permanent depressions or pockets due to the lack of recoverability of the pad upon removal of the passenger load. This is largely due to insufficient wire support, lack of interbinding between the independent strands of wire supports, and other inherent factors in these constructions.

Accordingly, it is an object of this invention to provide a support pad for covering springs that completely and economically allows control of the "feel" element; that does not detract from resilient form fitting comfort designed into the springs; that covers the entire surface of the article even if it is three dimensionally contoured; that very effectively distributes the passenger load over a large portion of the article that readily recovers upon removal of the passenger load to reassume a smooth surface; and that possesses excellent durability over a long period of time.

Further objects are to provide such a support pad wherein each layer thereof provides its separate function upon receiving a passenger load, but which layers are effectively associated with each other to simultaneously return to normal position upon removal of the passenger load without shifting with respect to each other or with respect to the article; wherein a reinforced woven wire mesh support having complete continuity, optimum tensile strength, and complete recovery ability is incorporated; and wherein any contoured seat may be completely covered to all edges thereof by all layers of the pad to obtain an excellent insulating effect over the entire surface.

A still further object of this invention is to provide a novel method of producing a spring support pad wherein an improved pad may be very economically produced by relatively simple steps completely adaptable to continuous high speed production operations; with which no involved weaving of wires into cloth sheets or sealing of wire into expensive plastic sheets is necessary; and with which a pad may be produced quickly,: efficiently and relatively inexpensively as compared to prior known methods.

Further objects and advantages of the support pad and the method of making a support pad will be apparent upon studying the following specification in conjunction with the drawings in which.

Figure 8:
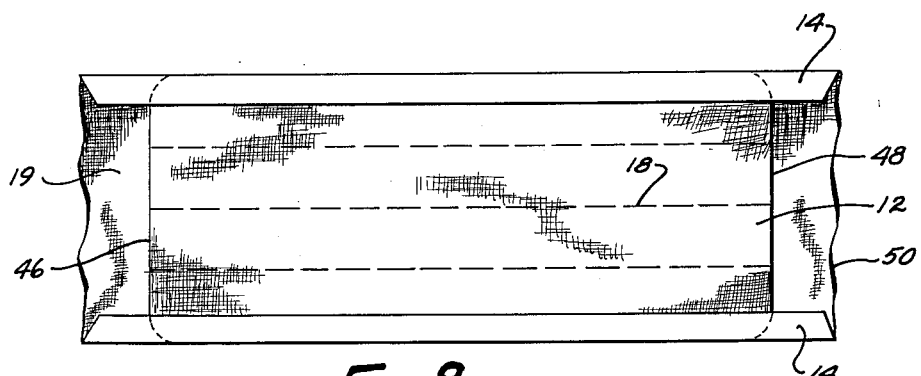
Figure 7:
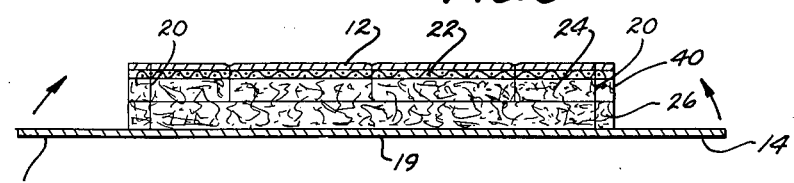
FIG. 7 is a sectional view of the laminate in FIG. 6 as inverted and placed in contact with a second cloth sheet.

FIG. 8 is a plan view of the laminate in FIG. 7 after the extending cloth sheet side edges are folded thereover and secured;

FIG. 9A is a plan view simulating the successive continuous operational steps one form of in the novel method; and FIG. 9B is a fragmentary plan view simulating alternative steps to those initial steps in FIG. 9A in the continuous operational steps of the novel method.

The invention comprises a basic support pad of a composite laminate of a cloth sheet, a reinforced woven wire mesh layer and a layer of fibrous unwoven material, all secured firmly together, preferably by stitching. To this may optionally be added a second padding layer placed adjacent the first fibrous padding layer. Covering this optional second padding layer, or in the alternative, covering the exposed surface of the first padding layer when the second one is not used, is a sheet of cloth which also envelops the side edges of the entire laminate. All of these layers are secured together, preferably by adhesives or alternatively by conventional double stitching. The ends of this second cloth sheet may be folded to envelop the ends of the elongated seat pad laminate and adhered thereto as by adhesive bonding or stitching as desired.

The novel method basically comprises forming a laminate by building up successive layers from a continuous layer of woven cloth, a layer of reinforced woven wire mesh, and a layer of unwoven generally unoriented fibrous padding material, these three layers being firmly secured together, preferably by stitching.

After stitching, the basic laminate is die-cut into a plurality of individual pads having the desired configuration to match a seat. If the wire mesh is applied in a continuous layer, it is die-cut simultaneously with the other layers. If the wire mesh is applied in a pre-cut form, the die cutting severs the additional layers adjacent the periphery of the pre-cut wire sheet. Of course, the cloth may be cut by slower manual operation if desired. A continuous second padding layer optionally may be applied to the first padding layer before any cutting takes place, and the entirety then simultaneously die-cut to the desired configuration. Next, the laminated individual pads are inverted and placed in contact with a continuous second cloth sheet. Thereafter, the long sides of the continuous second cloth sheet are folded over the side edges of the several layers into contact with the first cloth sheet and are secured to the entire laminate, as with adhesives or by stitching. Next, the continuous second cloth sheet is severed, either coextensively with the cut ends of the laminate or so as to leave an excess to be folded over the end edges of the laminate and secured as by adhesive bonding or by stitching and the like.

In the figures, the pad and the method are generally explained in terms of an automobile support pad but of course this is only one use thereof and therefore illustrative only.

Figure 1:
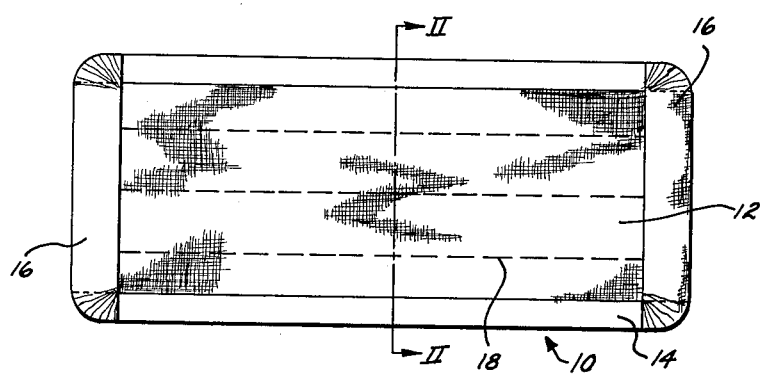
FIG. 1 is a plan view of the novel support pad.

Referring now to FIG. 1, the support pad 10 includes a top cloth sheet 12, folds 14 of a lower cloth sheet and end folds 16 of the same lower sheet as secured to sheet 12. Top sheet 12 is secured to at least part of the laminate layers by rows of stitches 18 which may be a single chain or basting stitch. Flaps 14 are secured to the entire laminate by adhesives or by a double chain stitch, for example.

Figure 2:
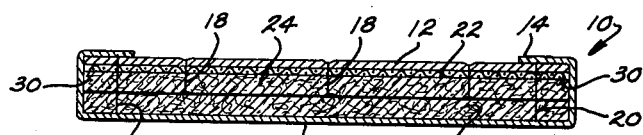
FIG. 2 is a cross sectional view taken along plane II—II of FIG. 1.
Figure 3:
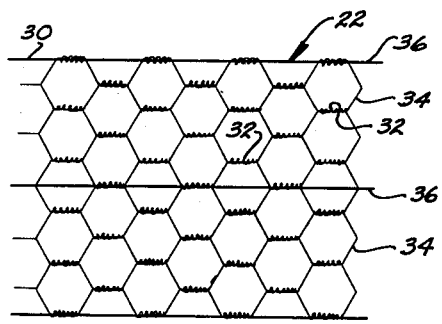
FIG. 3 is a fragmentary plan view of the wire mesh reinforcing layer incorporated into the pad.

Referring to the sectional view of this pad in FIG. 2, top woven cloth layer 12, which may be a burlap cloth material, is adjacent layer 22 of a sheet of reinforced woven wire mesh, which in turn is coextensive with a layer of unwoven fibrous material 24, such as colored inexpensive cotton fibers. This fibrous layer as depicted thus constitutes in the art an "under" or "spring" pad layer. The burlap sheet, wire mesh, and underpad are stitched together by stitching 18. Adjacent underlayer 24 is the optional second padding layer 26 constituting a topper pad. It may be formed of a fibrous unwoven material such as cotton or cotton and wool fibers, or it may be formed of a foam elastic material such as rubber and the like. The composite layers are then secured firmly together as by stitching 20 to bind the unit into an integrated whole. Layer 26 is completely covered by a second woven cloth layer 28 which may be of an inexpensive stretchy material known in the art as tobacco cloth. This tobacco cloth sheet is folded to envelop the side edges of the laminated layers and overlap portions of the under side of the pad in contact with first cloth sheet 12 as at 14. The tobacco cloth edges are adhered to sheet 12 as by adhesives. The woven wire mesh layer 22 is generally coextensive with its adjacent layers but preferably has its free ends 30 deformed to project into the under pad layer 24. This effectuates an anchoring function to supplement the stitching.

In use, the woven wire mesh constitutes a lower sustaining layer for the pad. Cloth sheet 12 prevents metal-to-metal contact of the wire mesh with the automobile seat springs and maintains the integrity of the laminated pad. Wire layer 22 possesses a conventional polygonal, here hexagonal, wire mesh woven together on parallel legs 32 of the hexagons 34. The continuity of the wire sheet affords excellent reinforcement to the pad and may be cut and formed to the contour of any seat or to any mattress or the like as will be explained hereinafter. To impart improved tensile strength and recoverability properties to this continuous woven wire mesh, a plurality of longitudinal and generally parallel cross wires or reinforcing strands 36 are provided at spaced intervals. These strands may be formed of 18 to 20 gauge steel wire, for example, and are hardened as by oil tempering to obtain a spring steel. The interval between these parallel support strands may range for example from 1 to 6 inches depending upon the seat width, the tension required, economic factors, and other considerations. The resulting pad from this composite of layers of relatively inexpensive materials is superior in all respects to prior art insulating pads. The pad may be economically mass produced to fit any article contour completely for complete control of "feel." The pad is free from the bunching defects of prior pads caused by disorganization of the several layers with respect to each other. It possesses excellent recoverability from load-caused depressions and yet very nicely conforms to the passenger's bodily configuration for maximum comfort. Further, it may be formed on conventional equipment and using simple conventional methods rather than expensive peculiar and inferior ones as in the prior art. In addition, only one sheet of burlap need be used in the entire assembly.

*Method*

Figure 4:
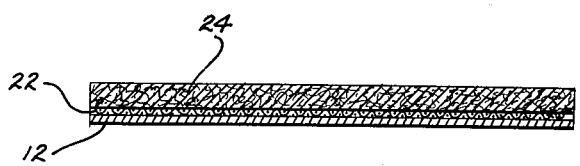
FIG. 4 is a sectional view showing the first operational steps in forming the laminated pad.
Figure 5:
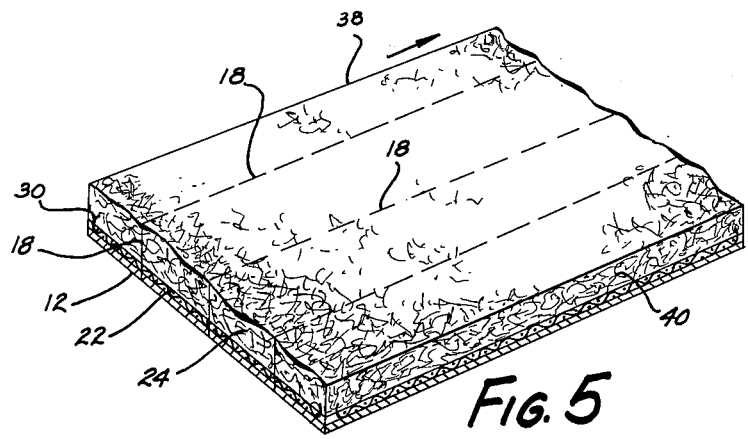
FIG. 5 is a perspective view showing the laminate after a stitching operation has occurred.
Figure 6:
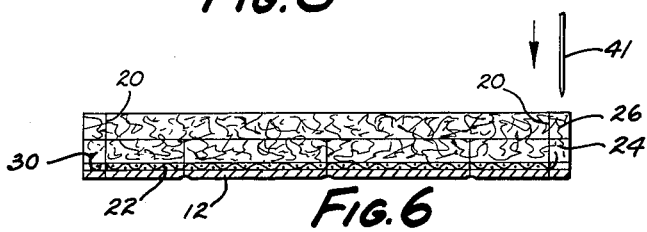
FIG. 6 is a cross sectional view showing the laminate of FIG. 5 with another fibrous layer added and stitched, and ready for cutting to the desired configuration.

Referring to FIG. 4, the three basic layers of the pad are there depicted. In FIG. 9 is represented the successive layers and steps of the unique method. The first few steps in the method may be varied somewhat as alternatively depicted in FIGS. 9A and 9B depending upon whether the wire mesh layer is pre-cut or is to be cut by dies or the like during the operational sequence. In forming the pad according to the process steps depicted in FIG. 9A, a continuous sheet of woven cloth 12 such as burlap is unrolled onto a flat surface. Then a sheet of reinforced woven wire mesh 22 is unrolled upon the burlap 22 as depicted in FIG. 9. The free ends 30 of the mesh are preferably deformed upwardly to project into the next layer to be applied. Next, a layer of inexpensive fibrous unwoven material 24, e.g. of colored cotton fibers, is formed upon the woven wire 22 as shown in FIG. 4 by depositing the generally unoriented fibers in a continuous sheet from a roll 25 or the like. Of course the fibers may be applied in the loose form and compacted in a continuous layer after application, if desired. Each of the layers in this laminate are formed with a predetermined width between side edges 38 and 40 (FIG. 5) and with a continuous length as depicted in FIG. 9 to readily adapt to high speed operations. After these three layers depicted are compiled, they are firmly secured together at a multiple of places across the width of the laminate. This can be effected with continuous rows of stitching 18 by passing the layers through a conventional industrial sewing machine 27, e.g. a Fales machine. The number of stitching rows may be varied somewhat as desired, but are preferably placed approximately two inches apart and comprise a loose stitch of approximately 1⅜ inches length. During the stitching steps the sewing needles often directly contact and sever the wires in the sustaining wire layers. With the relatively few, stiff, large and unconnected prior art wires, this caused frequent projection of wires out of the pad. With the present interconnected wire mesh, a few broken wires is inconsequential since they are so interwoven that the broken ones remain generally in the same position as before. After securing these layers together, an optional upper or topper layer 26 may be applied at 29 adjacent layer 24 as in FIG. 6. This topper pad may be formed of more expensive unwoven fibers of cotton, cotton and wool, or other fibrous material, or may comprise a continuous sheet of foam rubber or plastic or any other equivalent material known in the art. When the topper pad is used, the entire laminate is stitched a second time in stitcher 33 to supply edge stitches 20 for securing the layers together. One of the main purposes of this second stitching step is to prevent layer separation during the later inversion step (see FIG. 6). Thereafter, individual laminates having a configuration to match an automobile seat or whatever article is to be supplied with a support pad are die-cut out of the continuous layers, e.g. with a cutting die or shear 41. This operation includes a simultaneous shearing of all layers to the same configuration, including the wire supporting layer 22. This is in sharp contrast to prior art methods. The excess wire can be economically discarded using the described wire mesh whereas the expense of the special stiff and large prior art wires prohibited the discard of excess. Each of these configurated laminates is then inverted as depicted in FIGS. 7 and 9, and placed on a continuous sheet strip of woven cloth material 19, such as inexpensive cloth known as tobacco cloth, which preferably has a width substantially wider than the composite laminate. The edges 14 of sheet 19 projecting beyond the sides of the laminate are continuously folded up and over the laminate, as depicted by the arrows in FIG. 7 and shown more specifically in FIGS. 8 and 9, to envelop the side edges 38 and 40 of the laminate. The folds are secured to the laminate by adhering or the like. A latex adhesive or the like is first applied and then cured by passing the laminate through hot rolls 31. Of course, the particular adhesive used is not limiting. Further, the securing may be even be done with stitching, if desired. This step integrates the pad very effectively to help prevent permanent sag formation in the seat, and rumpling of the several layers with respect to each other. Thereafter, the tobacco cloth or other woven cloth sheet 19 may be severed co-extensively with the ends 46 and 48 of the remainder of the pad to provide an open-end type pad, or may be severed a substantial distance beyond these ends as at 50 to facilitate folding of the ends over the end edges of the pad as shown at 16 in FIG. 1. These end folds are secured by suitable methods such as stitching or with adhesives. A latex adherent has been found to be very satisfactory.

In FIG. 9B is depicted the same process but with a few modifications resulting from the use of pre-cut wire mesh instead of a continuous sheet thereof. The burlap 12 is unrolled as before. Next, a marker 35 delineates by ink-marking the successive boundaries 37 of pad formation on the burlap 12. Next pre-cut wire mesh pieces 39 are placed within the corresponding mark boundaries 37 in contact with burlap 12. Next fibers 24 are applied at 25 exactly as in 9A and the process continues as in 9A. Of course, during the die-cutting operation all layers will be severed except the wire mesh which is already the proper size. In order to align the pre-cut wire mesh with the cutting die, it may be desirous to invert the pad before die cutting to thus make the ink markings 37 on burlap 12 visible for hand alignment. If desired, the layers may be hand cut coextensively with the pre-cut wire mesh instead of being die-cut.

The continuous sheets of cloth are advantageously used to serve as the conveying means for the remaining laminate layers during the process as well as being one of the layers. The wire is readily applied to the cloth to further facilitate the continuous operation. It will be obvious to those having ordinary skill in the art that various modifications may be made in the unique pad and method disclosed without departing from the spirit of this invention. For example, the various process steps may be varied somewhat in sequence. Further, certain steps may be amplified or substituted by equivalent steps. Also, the materials may be altered somewhat as long as the essential characteristics set forth are maintained. The inventive concept disclosed is not intended to be limited to illustrative material but only by the definitions provided in the appended claims and the reasonable equivalents thereto.

We claim:

1. A support pad for spring containing articles comprising a sheet of woven wire mesh of interconnected polygons; said wire mesh having parallel elongated hardened reinforcing strands therein; a layer of fibrous unwoven material adjacent one side thereof; a sheet of woven cloth covering said fibrous layer; and a second sheet of woven cloth covering said wire mesh; said mesh, fibrous material, and cloth sheets being firmly secured together.

2. A support pad for spring containing articles comprising a sheet of reinforced woven wire mesh; a layer of fibrous unwoven material generally coextensive with said wire sheet on one side thereof; a first sheet of woven cloth adjacent said wire on the opposite side thereof; said wire, fibrous material, and cloth being secured together; and a second sheet of woven cloth covering said fibrous layer; said second sheet enveloping edges of said wire, said fibrous material, and said first cloth sheet, and having portions overlapping part of the exposed surface of said first cloth sheet; said overlapping portions being secured to the pad.

3. A spring support pad comprising a sheet of reinforced woven wire mesh; a layer of fibrous unwoven material generally coextensive with said wire sheet on one side thereof; a first sheet of woven cloth adjacent said wire on the opposite side thereof; said wire, fibrous material, and cloth being secured together; and a second sheet of woven cloth covering said fibrous layer; said second sheet enveloping edges of said wire, said fibrous material, and said first cloth sheet, and having portions overlapping part of the exposed surface of said first cloth sheet; and said overlapping portions being secured to said pad.

4. A spring support pad for automobile seats, mattresses and the like comprising a sheet of reinforced woven wire mesh; a layer of fibrous unwoven material generally coextensive with said wire sheet on one side thereof; a first sheet of woven cloth adjacent said wire on the opposite side thereof; said wire, fibrous material, and cloth being stitched together over a major portion thereof; and a second sheet of woven cloth covering said fibrous layer; said second sheet enveloping edges of said wire, said fibrous material, and said first cloth sheet, and having portions overlapping part of the exposed surface of said first cloth sheet; said overlapping portions being firmly secured to said pad.

5. A spring support pad for automobile seats, mattresses and the like comprising a sheet of reinforced woven wire mesh; a layer of fibrous unwoven material generally coextensive with said wire sheet on one side thereof; a first sheet of woven cloth adjacent said wire on the opposite side thereof; said wire, fibrous material, and cloth being stitched together over a major portion thereof; a topper layer of resilient material adjacent said fibrous layer; and a second sheet of woven cloth covering said resilient layer; said second sheet enveloping edges of said resilient layer; said fibrous layer, said wire and said first cloth sheet, and having portions overlapping part of the exposed surface of said first cloth sheet; and said overlapping portions being secured to said first cloth sheet.

6. A spring support pad for automobile seats, mattresses and the like comprising a sheet of woven wire mesh; said woven wire having parallel elongated hardened reinforcing wire strands; a layer of fibrous unwoven material generally coextensive with said wire on one side thereof; a first sheet of woven cloth adjacent said wire on the opposite side thereof; said wire, fibrous material, and cloth being stitched together over a major portion thereof; and a second sheet of woven cloth covering said fibrous layer; said second sheet enveloping edges of said wire, said fibrous material, and said first cloth sheet, and having portions overlapping part of the exposed surface of said first cloth sheet; and said overlapping portions being secured to said first cloth sheet.

7. A spring support pad for automobile seats, mattresses and the like comprising a sheet of reinforced woven wire mesh; a layer of fibrous unwoven material generally coextensive with said wire sheet on one side thereof; a first sheet of woven cloth adjacent said wire on the opposite side thereof; said wire, fibrous material, and cloth being stitched together over a major portion thereof; a topper layer of resilient material adjacent said fibrous layer; and a second sheet of woven cloth covering said resilient layer; said second sheet enveloping side edges of said resilient layer, said fibrous layer, said wire and said first cloth sheet, and having portions overlapping part of the exposed surface of said first cloth sheet; said overlapping portions being secured to said first sheet; and the ends of said second cloth sheet overlapping the terminal edges of said layers and sheets and secured to said first cloth sheet.

8. A spring support pad for automobile seats, mattresses and the like comprising a sheet of reinforced woven wire mesh; a layer of fibrous unwoven material generally coextensive with said wire sheet on one side thereof; the ends of said wire being deformed into said fibrous layer to penetrate and anchor said layer to said wire; a first sheet of woven cloth adjacent said wire on the opposite side thereof; said wire, fibrous material, and cloth being secured together; and a second sheet of woven cloth covering said fibrous layer; said second sheet enveloping edges of said wire, said fibrous material, and said first cloth sheet, and having portions overlapping part of the exposed surface of said first cloth sheet; said overlapping portions being secured to the remainder of the laminated pad.

9. A spring support pad for automobile seats, matresses and the like comprising a sheet of woven wire mesh; elongated parallel hardened steel reinforcing strands woven into said mesh; a layer of fibrous unwoven material generally coextensive with said wire sheet on one side thereof; the ends of said wire being deformed into said fibrous layer to penetrate and anchor said layer to said wire; a first sheet of woven cloth adjacent said wire on the opposite side thereof; said wire sheet, fibrous layer, and cloth sheet being stitched together over a major portion thereof; a topper layer of resilient material adjacent said fibrous layer; and a second sheet of woven cloth covering said resilient layer; said second sheet enveloping edges of said resilient layer, said fibrous layer, said wire, and said first cloth sheet, and having portions overlapping part of the exposed surface of said first cloth sheet; said overlapping portions being secured to said first cloth sheet.

References Cited in the file of this patent

UNITED STATES PATENTS

| 1,394,005 | Graff et al. | Oct. 18, 1921 |
| 2,582,479 | Clark | Jan. 15, 1952 |
| 2,638,154 | Dewees | May 12, 1953 |
| 2,758,630 | Hodge | Aug. 14, 1956 |
| 2,778,411 | Clark | Jan. 22, 1957 |

FOREIGN PATENTS

| 120,308 | Great Britain | Nov. 7, 1918 |